(12) United States Patent
Miyao et al.

(10) Patent No.: US 10,144,184 B2
(45) Date of Patent: Dec. 4, 2018

(54) FLAT FIBER-REINFORCED PLASTIC STRAND, FLAT FIBER-REINFORCED PLASTIC STRAND SHEET, AND METHOD OF MANUFACTURING THE SAME

(71) Applicant: Nippon Steel & Sumikin Materials Co., Ltd., Tokyo (JP)

(72) Inventors: Makiji Miyao, Tokyo (JP); Akira Kobayashi, Tokyo (JP); Masaki Arazoe, Tokyo (JP); Akihiro Tateishi, Tokyo (JP)

(73) Assignee: Nippon Steel & Sumikin Materials Co., Ltd., Tokyo (JP)

( * ) Notice: Subject to any disclaimer, the term of this patent is extended or adjusted under 35 U.S.C. 154(b) by 257 days.

(21) Appl. No.: 14/904,247

(22) PCT Filed: Jul. 9, 2014

(86) PCT No.: PCT/JP2014/068841
§ 371 (c)(1),
(2) Date: Jan. 11, 2016

(87) PCT Pub. No.: WO2015/005493
PCT Pub. Date: Jan. 15, 2015

(65) Prior Publication Data
US 2016/0151984 A1 Jun. 2, 2016

(30) Foreign Application Priority Data
Jul. 12, 2013 (JP) .................. 2013-146830

(51) Int. Cl.
| B29C 70/26 | (2006.01) |
| B29C 70/50 | (2006.01) |
| B29C 70/56 | (2006.01) |
| B29C 71/00 | (2006.01) |
| D02G 3/04 | (2006.01) |
| D04H 3/05 | (2006.01) |
| D04H 3/12 | (2006.01) |
| B29K 63/00 | (2006.01) |
| B29K 105/10 | (2006.01) |
| B29L 7/00 | (2006.01) |

(52) U.S. Cl.
CPC ............ B29C 70/504 (2013.01); B29C 70/56 (2013.01); B29C 71/0009 (2013.01); D02G 3/04 (2013.01); D04H 3/05 (2013.01); D04H 3/12 (2013.01); *B29K 2063/00* (2013.01); *B29K 2105/10* (2013.01); *B29K 2995/0097* (2013.01); *B29L 2007/007* (2013.01); *B29L 2007/008* (2013.01); *D10B 2101/12* (2013.01)

(58) Field of Classification Search
CPC . B29C 70/504; B29C 70/56; B29L 2007/007; B29L 2007/008
See application file for complete search history.

(56) References Cited

U.S. PATENT DOCUMENTS

2010/0009116 A1* 1/2010 Takeda .................... B29C 70/16
428/114
2012/0251823 A1* 10/2012 Maldonado ........... B29B 15/122
428/367

FOREIGN PATENT DOCUMENTS

| CN | 102660118 A | 9/2012 | |
| EP | 0036635 A2 | 9/1981 | |
| JP | H4269516 A | 9/1992 | |
| JP | 2003127267 A | 5/2003 | |
| JP | 2004197325 A | 7/2004 | |
| JP | 2006150904 A | 6/2006 | |
| JP | 2008231289 A | 10/2008 | |
| JP | 2010106641 A | 5/2010 | |
| JP | 2011056816 A | 3/2011 | |
| JP | 2012131874 A * | 7/2012 | ........... B29C 70/521 |
| JP | 2012131875 A | 7/2012 | |
| JP | 201517228 A | 1/2015 | |

OTHER PUBLICATIONS

English Translation; Takea et al; JP 2012-131874 A; Jul. 2012.*
Office Action dated Jun. 6, 2017 in JP Application No. 2013/146830.
Office Action dated Dec. 22, 2016 in CN Application No. 201480039419.6.
Extended Search Report dated Mar. 8, 2017 in EP Application No. 14822504.8.
International Search Report dated Oct. 28, 2014 in International Application No. PCT/JP2014/068841.

* cited by examiner

*Primary Examiner* — Karuna P Reddy
(74) *Attorney, Agent, or Firm* — Panitch Schwarze Belisario & Nadel LLP

(57) ABSTRACT

Provided is a flat fiber-reinforced plastic strand which is produced by curing a twisted resin-impregnated strand and has no disturbed fiber orientation, and a flat fiber-reinforced plastic strand sheet which is produced by using said flat fiber-reinforced plastic strands. According to a method of manufacturing the flat fiber-reinforced plastic strand 2, (a) a twisted resin-impregnated strand f2 in an uncured state, the strand including a plurality of reinforcing fibers f, is fed in a state of tension between a pair of heated steel belts 41A and 41B facing each other and making rotation movements; and (b) the resin-impregnated strand f2 is sandwiched and heated by the steel belts 41A and 41B, and pressurized from both sides of the strand f2 to form a cross section of the strand into a flat shape, and, with the shape being kept, a resin is cured and cooled.

7 Claims, 9 Drawing Sheets

FLAT FIBER-REINFORCED PLASTIC STRAND, FLAT FIBER-REINFORCED PLASTIC STRAND SHEET, AND METHOD OF MANUFACTURING THE SAME

CROSS-REFERENCE TO RELATED APPLICATION

This application is a Section 371 of International Application No. PCT/JP2014/068841, filed Jul. 9, 2014, which was published in the Japanese language on Jan. 15, 2015, under International Publication No. WO 2015/005493 A1, and the disclosure of which is incorporated herein by reference.

TECHNICAL FIELD

The present invention relates to a strand made of fiber-reinforced plastic and having a cross section in a flat shape (hereinafter, referred to as a "flat fiber-reinforced plastic strand"), and a method of manufacturing the same, and furthermore, relates to a fiber-reinforced plastic sheet in which such flat fiber-reinforced plastic strands are arranged in the form of sheet (hereinafter, referred to as a "flat fiber-reinforced plastic strand sheet"), and a method of manufacturing the same. The flat fiber-reinforced plastic strand sheet is widely applicable to, for example, RTM, as a large-sized FRP (fiber reinforced plastic) used for, for example, blades for windmills, vehicles, and vessels, and also applicable as a reinforcement for reinforcing civil-engineering structures, such as a concrete structure, a steel structure, and a fiber-reinforced plastic structure.

BACKGROUND ART

Conventionally, a fiber-reinforced plastic sheet which is produced by arranging fiber-reinforced plastic strands produced using reinforcing fiber, such as carbon fiber, in the form of sheet has been widely applied in, for example, RTM, as a large-sized FRP (fiber reinforced plastic) used for, for example, blades for windmills, vehicles, and vessels. Furthermore, such fiber-reinforced plastic sheet has been also applied as a reinforcement which adheres to and thereby reinforces civil-engineering structures such as a concrete structure, a steel structure, and a fiber-reinforced plastic structure.

Here, in the case where a fiber-reinforced plastic sheet is used for, for example, RTM, or in the case where a fiber-reinforced plastic sheet is used to be bonded to a structure, such as a concrete structure or a steel structure, thereby reinforcing the structure, if fiber-reinforced plastic strands which constitute the fiber-reinforced plastic sheet have a round shape, the plate thickness (that is, reinforcement thickness) is thicker, and the amount of adhering resin is larger. On the other hand, when the fiber-reinforced plastic strands have a flat shape, the same reinforcement strength as that obtained in the case of using the round fiber-reinforced plastic strands can be achieved with a thinner reinforcement thickness and a smaller amount of adhering resin.

Furthermore, also in the case where a fiber-reinforced plastic strand is used as a reinforcement bar embedded in, for example, a concrete structure or a glass-fiber-reinforced plastic structure, the fiber-reinforced plastic strand having a flat shape allows the plate thickness of a portion in which the reinforcement bar is embedded to be thinner, and accordingly allows more reinforcing fibers to be fed within a certain plate thickness, and, compared to a round strand, the flat strand allows a fiber content within a certain volume (that is, Vf) and targets for the cross section stiffness and strength of a structure to be achieved with a thinner plate thickness.

However, in the case where a fiber-reinforced plastic strand having a flat shape, that is, a flat fiber-reinforced plastic strand is produced by pultrusion forming process as is the case with the producing of a round strand, there are a restriction on die and a restriction on the number of strands to be manufactured due to a limit in the number of holes. Furthermore, a problem is encountered in that use of a release agent is indispensable for preventing a matrix resin from sticking to a die, and bonding of a product obtained after forming to resin or concrete to be bonded later does not go well.

Patent Literatures 1 and 2 disclose:

(1) a manufacturing method wherein a reinforcing fiber bundle (strand) to be continuously fed is impregnated with a resin while being twisted, or a resin-impregnated strand which has been impregnated with a resin is twisted, and then, this resin-impregnated strand having been impregnated with the resin and twisted is given a prescribed tensile force, whereby a fiber-reinforced plastic strand having a round cross section is produced; and (2) a manufacturing method wherein a plate-shaped die is used in order to make a resin-impregnated round strand containing an uncured resin into a plate-shaped strand, and the plate-shaped die is released from a flat strand product not by using a release agent, but by continuously interposing a thin cloth (for example, a polyester textile called as "peel ply") which does not adhere to an adhesive into the top and bottom surfaces of strand to be formed, and peeling away the cloth after the resin is cured. Such manufacturing methods have advantages that it is beneficial to simply lead the resin-impregnated round fiber bundle into a plate-shaped die, and, since the top and bottom of the bundle are protected by the thin cloth for release and the resin-impregnated fiber bundle does not directly touch the die accordingly, the resin-impregnated fiber bundle is less damaged, thread breakage during manufacturing occurs with far less frequency, and forming yields can be considerably increased, accordingly.

PRIOR ART DOCUMENT

Patent Literature

[Patent Literature 1]
Japanese Patent Application Publication No. Tokkai-2012-131874
[Patent Literature 2]
Japanese Patent Application Publication No. Tokkai-2012-131875

SUMMARY OF THE INVENTION

Problems to be Solved by the Invention

However, in the manufacturing methods disclosed in Patent Literatures 1 and 2, it is necessary to use subsidiary materials such as peel ply (peeling cloth), and there are many problems of material costs, equipment costs, and furthermore, disposal of used subsidiary materials.

The present inventors conducted further research experiments based on the arts disclosed in Patent Literatures 1 and 2, and found that, when a twisted and uncured, resin-impregnated strand is sandwiched between two heated steel belts, thereby being made flat and cured, a fiber-reinforced plastic strand having a flat shape (flat fiber-reinforced plastic strand) can be manufactured very efficiently.

The present invention is based on such novel findings of the inventors.

An object of the present invention is to provide a flat fiber-reinforced plastic strand which is produced by curing a twisted resin-impregnated strand and has no disturbed fiber orientation, and to provide a flat fiber-reinforced plastic strand sheet produced by using said flat fiber-reinforced plastic strand.

Another object of the present invention is to provide a method of manufacturing the flat fiber-reinforced plastic strand and a method of manufacturing the flat fiber-reinforced plastic strand sheet, the methods eliminating the use of subsidiary materials and solving problems of material costs, equipment costs, and furthermore, disposal of used subsidiary materials.

Means for Solving the Problems

The aforementioned objects are achieved with a flat fiber-reinforced plastic strand and a method of manufacturing the same, and a flat fiber-reinforced plastic strand sheet and a method of manufacturing the same according to the present invention. In summary, according to a first of the present invention, there is provided a method of manufacturing a flat fiber-reinforced plastic strand, the method comprising:
- (a) feeding a twisted resin-impregnated strand in an uncured state, the strands including a plurality of reinforcing fibers, in a state of tension between a pair of heated steel belts facing each other and making rotation movements; and
- (b) sandwiching and heating the resin-impregnated strand by the steel belts, and pressurizing the resin-impregnated strand from both sides of the strand to form the cross section of the strand into a flat shape, and, with the shape being kept, curing and cooling a resin.

According to a second of the present invention, there is provided a method of manufacturing a flat fiber-reinforced plastic strand sheet, the method comprising:
- (a) arranging a plurality of twisted resin-impregnated strands in an uncured state, the strands including a plurality of reinforcing fibers, is arranged in one direction along the longitudinal direction of the strands in a planar fashion, and feeding the strands in a state of tension between a pair of heated steel belts facing each other and making rotation movements;
- (b) sandwiching and heating the resin-impregnated strands by the steel belts, and pressurizing the resin-impregnated strands from both sides of the strands to form the cross section of the strands into a flat shape, and, with the shape being kept, curing and cooling a resin to produce flat fiber-reinforced plastic strands; and
- (c) subsequently, uniting and maintaining the flat fiber-reinforced plastic strands arranged in a planar fashion by a fixing material, thereby making said strands into a sheet.

According to an embodiment of the first and the second of the present invention, the number of twists of the resin-impregnated strand is from 5 twists/m to 30 twists/m.

According to another embodiment of the first and the second of the present invention, the resin-impregnated strand is tensioned with a force of 500 g/piece to 10 kg/piece.

According to another embodiment of the first and the second of the present invention, a release agent is continuously or periodically applied to the aforementioned steel belts which make rotation movements, and the steel belts are further heated to bake said release agent thereonto.

According to another embodiment of the first and the second of the present invention, a surface of the flat fiber-reinforced plastic strand produced in the step (b) is ground or washed with a solvent to remove the release agent which adheres to the surface.

According to another embodiment of the second of the present invention, the surfaces of the flat fiber-reinforced plastic strands produced in the step (b) in the second of the present invention are ground or washed with a solvent to remove the release agent which adheres to the surfaces, and then, the step (c) is performed.

According to another embodiment of the second of the present invention, between the flat fiber-reinforced plastic strands arranged in a planar fashion in the step (c), a prescribed gap (g) is formed along the longitudinal direction of the strands.

According to another embodiment of the second of the present invention, the prescribed gap (g) is from 0.1 mm to 3.0 mm.

According to a third of the present invention, there is provided a fiber-reinforced plastic strand having a cross-section in a flat shape, wherein the fiber-reinforced plastic strand is manufactured by the method of manufacturing the flat fiber-reinforced plastic strand according to the first of the present invention, and has a thickness (t) of 0.2 to 5.0 mm and a width (w) of 1.0 to 10.0 mm.

According to a fourth of the present invention, there is provided a flat fiber-reinforced plastic strand sheet, obtained by uniting and maintaining flat fiber-reinforced plastic strands arranged in a planar fashion by a fixing material to form a sheet, wherein the fiber-reinforced plastic strand sheet is manufactured by the method of manufacturing the flat fiber-reinforced plastic strand sheet according to the second of the present invention, and wherein the flat fiber-reinforced strands have a thickness (t) of 0.2 to 5.0 mm and a width (w) of 1.0 to 10.0 mm.

Effects of the Invention

According to the present invention, there can be provided a flat fiber-reinforced plastic strand having no disturbed fiber orientation, and a flat fiber-reinforced plastic strand sheet produced by using said flat fiber-reinforced plastic strand. Furthermore, according to the present invention, there can be provided a method of manufacturing the flat fiber-reinforced plastic strand and a method of manufacturing the flat fiber-reinforced plastic strand sheet, the methods eliminating the use of subsidiary materials and solving problems of material costs, equipment costs, and furthermore, disposal of used subsidiary materials.

BRIEF DESCRIPTION OF THE DRAWINGS

FIG. 5 (a) is a sectional view taken along line A-A in FIG. 4; and FIG. 5 (b) is a sectional view taken along line B-B in FIG. 4.

FIG. 6 (b) is a sectional view illustrating an arrangement state of resin-impregnated strands before heated and pressurized; and FIG. 6 (c) is a sectional view illustrating an arrangement state of flat fiber-reinforced plastic strands after heated, pressurized, and cured.

EMBODIMENTS FOR CARRYING OUT THE INVENTION

Hereinafter, the flat fiber-reinforced plastic strand and the method of manufacturing the strand, and the flat fiber-reinforced plastic strand sheet produced using the flat fiber-reinforced plastic strand and the method of manufacturing the sheet according to the present invention will be described in detail with reference to the drawings.

Embodiment 1

Flat Fiber-Reinforced Plastic Strand and Flat Fiber-Reinforced Plastic Strand Sheet First, a fiber-reinforced plastic strand produced by the manufacturing method according to the present invention and having a cross section in a flat shape, that is, a flat fiber-reinforced plastic strand 2 will be described.

Figure 8:
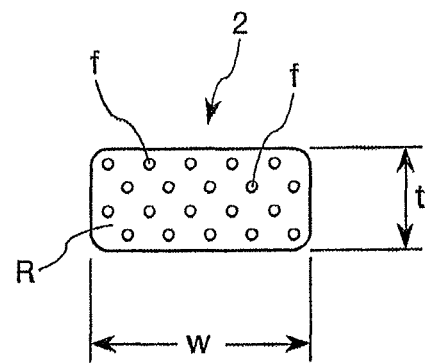
FIG. 8 illustrates the cross sectional shape of the flat fiber-reinforced plastic strand according to the present invention.

FIG. 8 illustrates a cross section of the flat fiber-reinforced plastic strand 2 manufactured by the manufacturing method according to the present invention. The flat fiber-reinforced plastic strand 2 is a strand whose cross-section is flat, that is, rectangular, and which is obtained by impregnating a plurality of reinforcing fibers f with a matrix resin R and curing the resin.

It is appropriate that the flat fiber-reinforced plastic strand 2 manufactured by the manufacturing method according to the present invention has a thickness (t) of 0.2 mm to 5.0 mm and a width (w) of 1.0 mm to 10.0 mm. A strand thickness (t) of less than 0.2 mm causes frequent occurrence of breakage of the reinforcing fibers f during manufacture. On the other hand, as described later in detail with reference to FIG. 1, a strand thickness (t) of more than 5.0 mm causes buckling of the fibers f upon winding a resin-impregnated reinforcing fiber bundle (resin-impregnated strand) f2 around winding bobbins 22, resulting in a serious decrease in physical properties such as strength of the flat fiber-reinforced plastic strand 2 after curing. The flat fiber-reinforced plastic strand 2 particularly preferably has a thickness (t) of 0.4 mm to 1.5 mm and a width (w) of 1.2 mm to 4.5 mm.

On the other hand, in the manufacturing method according to the present invention, carbon fiber is most preferably applicable as a reinforcing fiber. The reinforcing fiber is, however, not limited to this, but is an inorganic fiber, such as carbon fiber, glass fiber, or basalt fiber, or an organic fiber, such as aramid fiber, PBO fiber, polyamide fiber, polyester fiber, or polyarylate fiber, and one kind or a mixture of two or more kinds of these fibers is applicable.

The matrix resin is epoxy resin, vinyl ester resin, MMA resin, unsaturated polyester resin, or phenol resin.

Next, there will be described a flat fiber-reinforced plastic strand sheet produced using the flat fiber-reinforced plastic strand 2.

Figure 9:
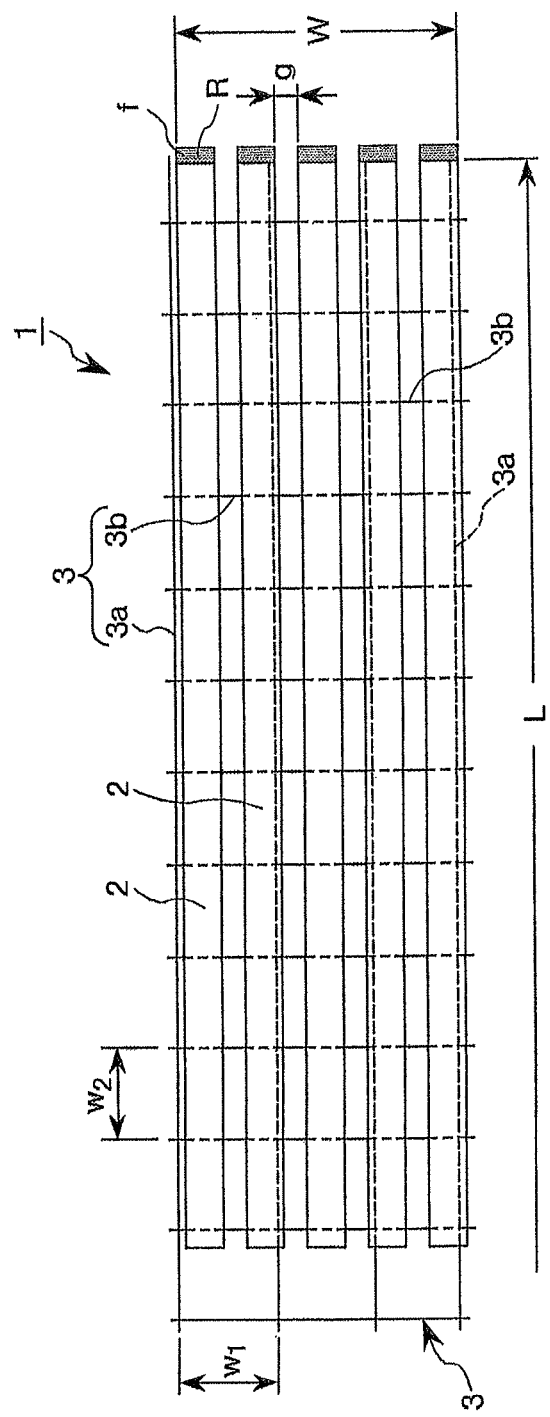
FIG. 9 illustrates an embodiment of the flat fiber-reinforced plastic strand sheet according to the present invention.

As illustrated in FIG. 9, a flat fiber-reinforced plastic strand sheet 1 is such that the flat fiber-reinforced plastic strands 2 are arranged in one direction in a blind form, and the strands 2 are adjacently spaced apart from each other by a gap (g) (g=0.1 to 3.0 mm), and fixed to each other by a fixing fiber material 3.

The total width (W) and the length (L) of the thus-produced flat fiber-reinforced plastic strand sheet 1 are appropriately determined in response to an intended use, but, from handling considerations, usually, the sheet having a total width (W) of 100 mm to 500 mm and a length (L) of not less than 100 m can be manufactured, and is appropriately cut to be used.

The aforementioned fixing fiber material 3 may be made of only weft 3b in FIG. 9, but, as illustrated, may be a mesh fabric having a double-axis configuration composed of warp 3a and weft 3b. As a matter of course, the fixing fiber material 3 is not limited to a material having a single-axis or double-axis configuration, but, may be a mesh woven fabric having a triple-axis, or multi-axis configuration. It should be noted that, in a mesh fabric 3 of this embodiment, an interval w1 between the warp 3a and an interval w2 between the weft 3b are not limited to, but selected usually within an interval range of 0.1 to 100 mm, considering handleability of a produced fiber sheet 1. The intervals w1 and w2 may be the same or may be different.

As a thread, there is applicable a doubled yarn, such as glass fiber, carbon fiber, aramid fiber, polyester fiber, or vinylon fiber, having a diameter of 50 to 1000 micrometers.

In this embodiment, there was described an aspect in which, as the fixing fiber material 3, a mesh woven fabric is used, but, the fixing fiber material 3 is not limited to this. There may be used, not a woven fabric, but a melt-bonded mesh support sheet which has been conventionally used, and is produced by simply superimposing threads on each other and melt-bonding the threads with a single axis, double axes, or multiple axes. As the melt-bonded mesh support sheet, for example, there may be used a melt-bonded mesh support sheet which is composed of threads obtained by beforehand impregnating glass fiber or organic fiber having a diameter of 2 to 50 μm with a low-melting-point thermoplastic resin, and produced with double or more axes, that is, multiple axes; or a melt-bonded mesh support sheet which is composed of a composite fiber having a dual-structure in which a thermal adhesive resin (for example, thermal adhesive polyester) is laid on the surface of glass fiber or organic fiber serving as a core part and having a diameter of 2 to 50 µm.

Furthermore, as the fixing fiber material 3, there may be used, for example, a nonwoven fabric which is produced using glass fiber, organic fiber, or the like and has a thickness of approximately 0.1 to 0.3 mm.

The further detailed configurations of the flat fiber-reinforced plastic strand 2 and the flat fiber-reinforced plastic strand sheet 1 will be made clear from the following descriptions about methods of manufacturing the flat fiber-reinforced plastic strand 2 and the flat fiber-reinforced plastic strand sheet 1.

Method and Equipment for Manufacturing the Flat Fiber-Reinforced Plastic Strand

Next, a method of manufacturing the flat fiber-reinforced plastic strand 2 will be described.

FIGS. 1 to 5 illustrate an embodiment of manufacturing equipment 100 (100A, 100B) for manufacturing the flat fiber-reinforced plastic strand 2 according to the present invention.

Figure 3:
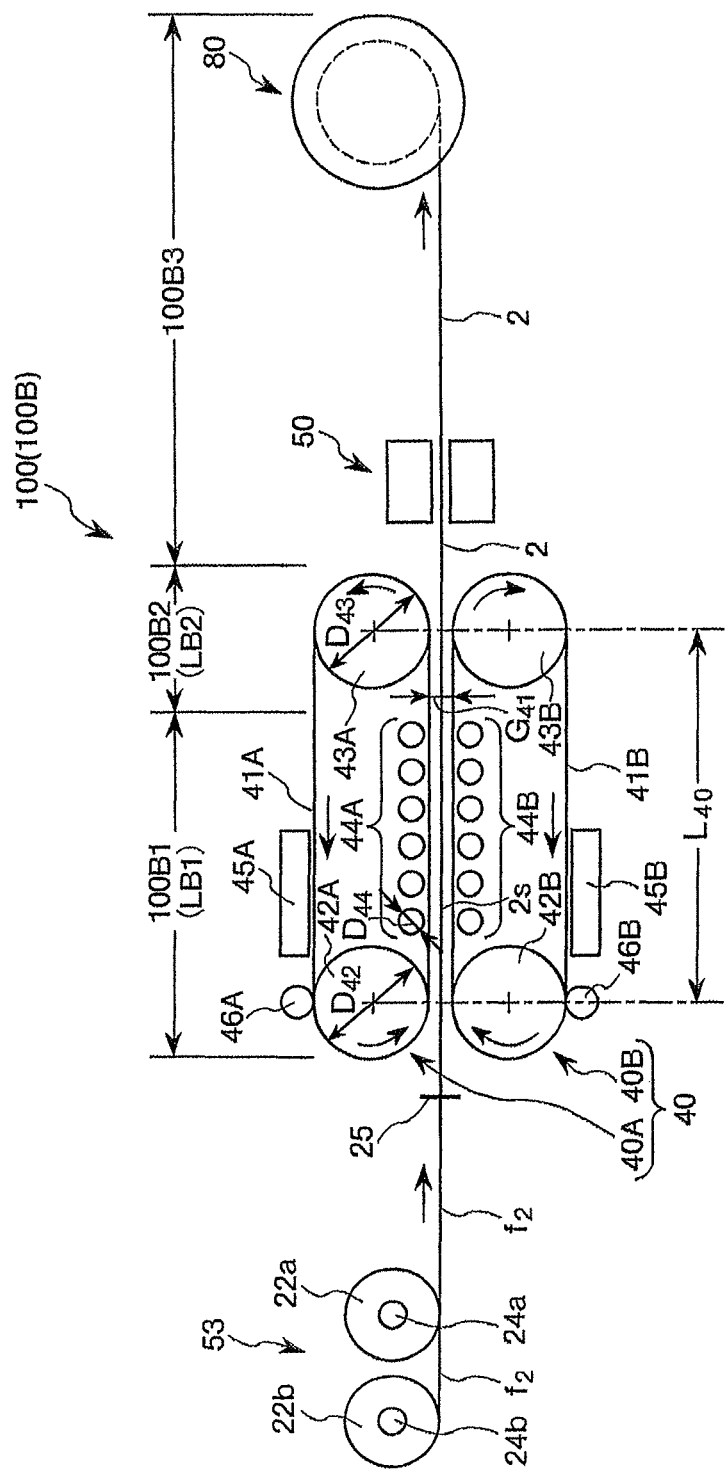
FIG. 3 is a schematic configuration view for describing an embodiment of manufacturing equipment configured to manufacture the flat fiber-reinforced plastic strand according to the present invention.

In this embodiment, the manufacturing equipment 100 (100A and 100B) for the flat fiber-reinforced plastic strand 2 is composed of a fiber-feeding, resin-impregnating, winding section 100A (FIG. 1) and a flat-forming (heating/pressurizing/curing), cooling, and take-up section 100B (100B1, 100B2, and 100B3) (FIG. 3).

Figure 1:
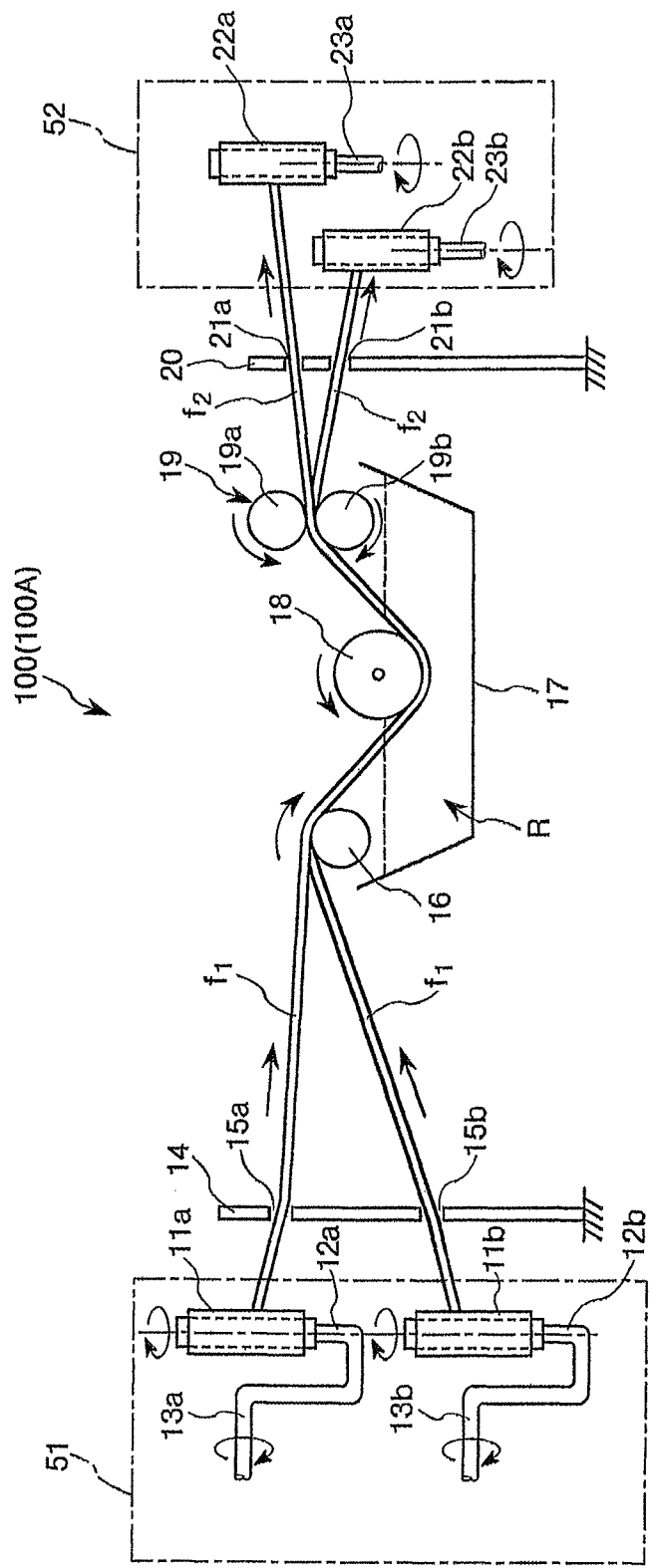
FIG. 1 is a schematic configuration view of manufacturing equipment for describing an embodiment of the method of manufacturing the flat fiber-reinforced plastic strand according to the present invention.

FIG. 1 illustrates the fiber-feeding, resin-impregnating, winding section 100A in the manufacturing equipment 100, wherein a strand (a fiber bundle) f1 comprising a plurality of reinforcing fibers f moves from left to right on the drawing, during the movement, twisting processing and resin impregnation are carried out to produce a resin-impregnated strand f2.

FIG. 3 illustrates the flat-forming (heating/pressurizing/curing), cooling, and take-up section 100B in the manufacturing equipment 100, wherein the resin-impregnated strand f2 which has undergone the twisting processing and the resin impregnation moves from left to right on the drawing, whereby flat forming and resin curing of the strand 2 are carried out to produce a flat fiber-reinforced plastic strand 2.

A more detailed description will now be given. In the fiber-feeding, resin-impregnating, winding section 100A illustrated in FIG. 1, a plurality of (usually, 3 to 18), two in this embodiment for the purpose of making the drawing simpler, delivery bobbins (cylindrical thread spools) 11 (11a and 11b) for fiber feeding are prepared, and a strand f1 comprising a prescribed number of reinforcing fibers f which are not-yet-impregnated with a resin is wound on each of the bobbins 11.

The strand f1 wound around each of the bobbins 11 is continuously fed to a resin impregnation step wherein a resin impregnation tank 17 is arranged. At the same time, the strand f1 is twisted (fiber-bundle-feeding and twisting-processing step).

In other words, the strand f1 fed to the resin impregnation step is impregnated with a resin in the resin impregnation tank 17, and the resin-impregnated strand f2 is wound in a twisted state around winding bobbins 22 (22a and 22b) (resin-impregnation and twisting-processing step).

In the flat-forming (heating/pressurizing/curing), cooling, and take-up section 100B illustrated in FIG. 3, at least one, usually a plurality of the twisted resin-impregnated strand f2 is delivered from a plurality of, usually 50 to 300 bobbins 22, two bobbins 22 (22a and 22b) in this embodiment for the purpose of making the drawing more easily understandable, and tensioned, then introduced to a heating/pressurizing/curing, and cooling device (hereinafter, referred to as a "forming and curing device") 40 which constitutes the flat-forming (heating/pressurizing/curing) section 100B1 and the cooling section 100B2. The resin-impregnated strand f2 is heated and pressurized in a state of tension, whereby the round cross section of the strand f2 is formed into a flat shape, and subsequently the strand f2 is cured and cooled, and thereby made into a flat fiber-reinforced plastic strand 2. Particularly, as described later, in the case where a release agent is used in the forming and curing device 40, a release agent removing means 50, for example, a strand surface grinding device is arranged to remove this release agent from the surface of the strand 2. Accordingly, the surface of each of the flat fiber-reinforced plastic strands 2 sent out from the forming and curing device 40 is ground by the surface grinding device 50 in the take-up section 100B3, and then, the flat fiber-reinforced plastic strands 2 are wound at a prescribed speed around a take-up reel 80 having a large diameter of not less than 1 m.

Thus, to the twisted resin-impregnated strands f2 introduced to the forming and curing device 40, a prescribed tensile force is applied by the forming and curing device 40 and the take-up reel 80 at the heating/pressurizing/curing step, and each of the resin-impregnated strands f2 is formed in a prescribed state of tension to be flat, accordingly. Thus, a plurality of the resin-impregnated strands f2 introduced in parallel to the heating/pressurizing/curing section 100B1 is heated, pressurized, and cured in a state in which the strands f2 are aligned in the direction of travel, whereby the disturbance of orientation of the strands f2 (that is, filaments f) is prevented.

Next, each of the aforementioned steps will be described in more detail.

Fiber-Bundle-Feeding and Twisting-Processing Step

Figure 2:
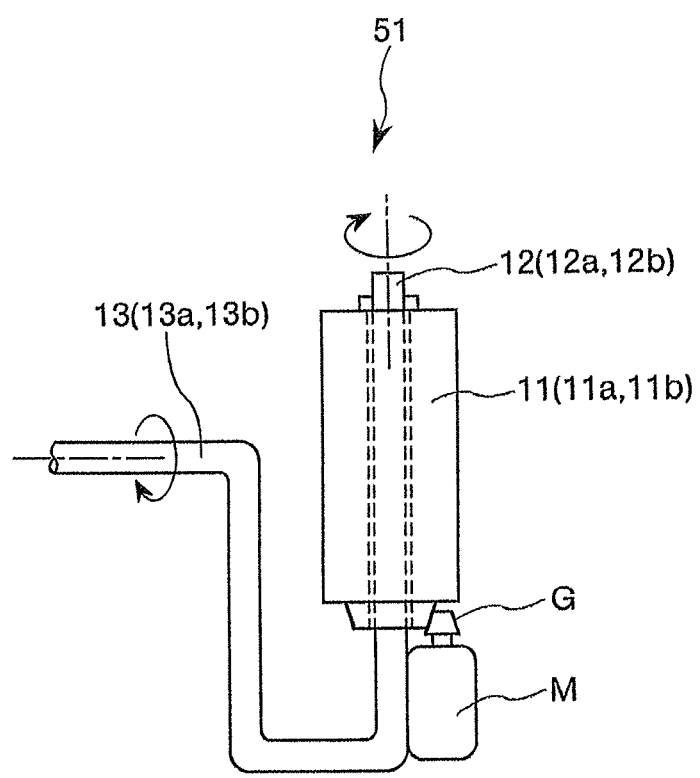
FIG. 2 is a schematic configuration view for describing the operation of a delivery bobbin in manufacturing equipment for describing an embodiment of the method of manufacturing the flat fiber-reinforced plastic strand according to the present invention.

As will be understood with reference to FIG. 1 and FIG. 2, in this embodiment, in the fiber-feeding, resin-impregnating, winding section 100A, the bobbins 11 (11a and 11b) are attached to rotating shafts 12 (12a and 12b) provided in a delivery device 51, and these rotating shafts 12 are rotatably attached to main rotating shafts 13 (13a and 13b) of the delivery device.

Each of the bobbins 11 (11a and 11b) rotates around a corresponding one of the rotating shafts 12 (12a and 12b) of the bobbins 11 (11a and 11b) by a driving motor M and a gear transmitting mechanism G, thus delivering the strand f1 wound around each of the bobbins 11 (11a and 11b). At the same time, each of the bobbins 11 (11a and 11b) rotates around a corresponding one of the main rotating shafts 13 (13a and 13b) along with the rotation around a corresponding one of the rotating shafts 12 (12a and 12b) while rotating around the corresponding one of the rotating shafts 12 (12a and 12b) as described above.

That is, the bobbins 11 rotate around the rotating shafts 12, and simultaneously, rotates around the main rotating shafts 13, thus delivering the strands f1.

The strands f1 delivered from the bobbins 11 are guided by guide holes 15 (15a and 15b) formed in a guide 14 and introduced into the resin impregnation tank 17 by an entry guide roll 16.

The aforementioned configuration allows the strands f1 to be fed in a twisted form to the impregnation step provided with the resin impregnation tank 17.

The number of twists provided per m can be controlled by adjusting the number of rotations of the bobbins 11 around the main rotating shafts 13 and the delivery speed of the strands f1.

Figure 6:
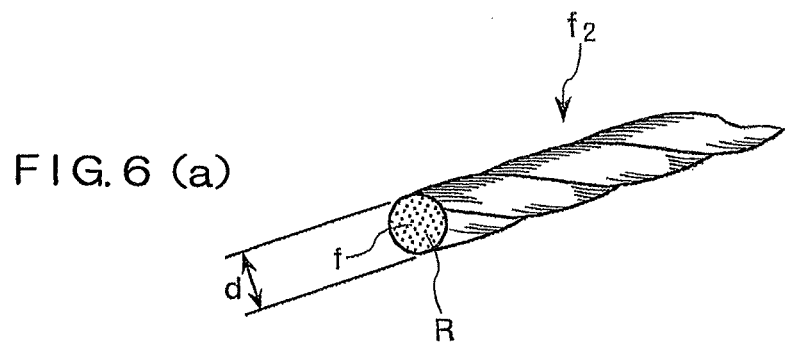
FIG. 6 (a) is a perspective view of an embodiment of a resin-impregnated strand used for manufacturing the flat fiber-reinforced plastic strand according to the present invention.
Figure 6:
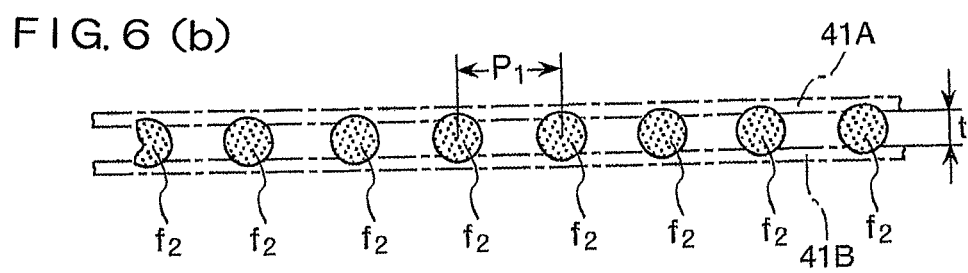
Figure 6:
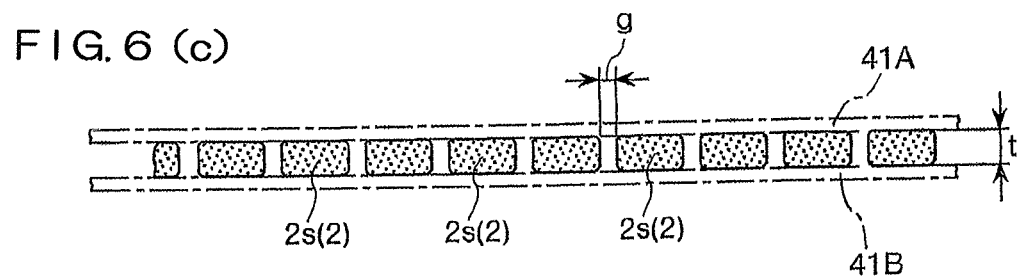

According to this embodiment, as mentioned above, for example, in order to produce a flat fiber-reinforced plastic strand 2 having a thickness (t) of 0.2 to 5.0 mm and a width (w) of 1.0 to 10.0 mm, a twisted resin-impregnated strand f2 before fed to the flat-forming (heating/pressurizing/curing) section 100B1 preferably has a diameter (d) (FIG. 6 (a)) of 0.8 to 3.0 mm. Therefore, as the strand f1 to be fed to the impregnation step, for example, in the case of using carbon fiber as the reinforcing fiber, a carbon fiber strand (carbon fiber bundle) f1 comprising a bundle of 6,000 to 60,000 (60 K) carbon fibers (filaments) f each having a diameter of 6 to 10 µm is employed.

A more detailed description will now be given. The flat fiber-reinforced plastic strand 2 manufactured by the manufacturing method of this embodiment has twists within a range from 5 to 30 twists per m (5 twists/m to 30 twists/m). Particularly, in the case of the strand f2 having a large diameter of approximately 50K to 60K, less than 5 twists/m causes a difficulty in ensuring a stable circular (round) shape of the strand even when a tension is applied before the curing of the resin, on the other hand, more than 30 twists/m causes a difficulty in formation of the strand into a flat shape, and hence, more than 30 twists/m is not preferable. Particularly, a twist range of 10 twists/m to 25 twists/m is optimum.

Resin Impregnation Step

The resin impregnation tank 17 contains a matrix resin R, and an entry guide roller 16 to guide the strands f1 is arranged at the entry of the impregnation tank 17 as described above. Furthermore, an impregnating roller 18 is arranged in the impregnation tank 17, and an exit guide roller pair 19 is arranged at the exit of the impregnation tank 17.

In the step of impregnating the strands f1 with a resin, the entry guide roller 16 has a role of lining up a plurality of fibers f before the impregnation, the fibers f constituting the strand f1 to be fed to the impregnation tank 17.

The impregnating roller 18 has a role of forcedly impregnating the strand f1 with the resin R and is used in a state in which the impregnating roller 18 is soaked, even slightly, in the resin R contained in the impregnation tank 17.

The exit guide roller pair 19 (19a and 19b) has a role of squeezing the resin-impregnated strand f2, and here, the amount of resin deposit is controlled.

That is, the amount of resin impregnated into the resin-impregnated strand f2 is controlled by controlling a gap between upper and lower rollers 19a and 19b and the pressing pressure of the upper and lower rollers 19a and 19b.

In this embodiment, the reinforcing fiber f content (Vf) of the resin impregnation strand f2 is preferably 30% to 70% in the volume ratio of the reinforcing fiber.

A more detailed description will now be given. When the reinforcing fiber content in volume ratio (Vf) is less than 30%, the amount of the fiber is small, thereby resulting in a decrease in physical properties such as strength. On the other hand, when the ratio is more than 70%, a shortage of resin is caused, thereby again resulting in a decrease in physical properties such as strength of the strand after manufacture. Hence, an optimum volume ratio of the reinforcing fiber is in a range of 40% to 60%.

Furthermore, in the manufacturing method of this embodiment, as mentioned above, carbon fiber is most preferably applicable as a reinforcing fiber, but, the reinforcing fiber is not limited to this, and one kind or a mixture of two or more kinds of inorganic fibers, such as carbon fiber, glass fiber, and basalt fiber, or organic fibers, such as aramid fiber, PBO fiber, polyamide fiber, polyester fiber, and polyarylate fiber, is applicable.

As the matrix resin, epoxy resin, vinyl ester resin, MMA resin, unsaturated polyester resin, and phenol resin are applicable, but, particularly, epoxy resin is preferably employed. Other resins are employed for special-purpose applications in markets, such as a market requiring a use at high temperatures and a market requiring special corrosion resistance.

The resin-impregnated strands f2 guided through guide holes 21 (21a and 21b) formed in a guide 20, and wound around the winding bobbins 22 (22a and 22b) in a winding device 52. FIG. 6(a) illustrates the strand f2 which is twisted and impregnated with the resin R.

Each of the winding bobbins 22 is rotationally driven around a corresponding one of rotating shafts 23 (23a and 23b).

The bobbins 22 having wound the resin-impregnated strands f2 are fed to the take-up section 100B3 via the heating/pressurizing/curing, and cooling step in the flat-forming (heating/pressurizing/curing) section 100B1 and the cooling section 100B2 illustrated in FIG. 3.

Heating/Pressurizing/Curing-Forming, Cooling Step, and Take-Up Step

Referring to FIG. 3, in the heating/pressurizing/curing-forming section 100B1 and the cooling section 100B2 (hereinafter, sometimes simply referred to as "forming and curing section"), the bobbins 22 (22a and 22b) having wound up the resin-impregnated strands f2 in the aforementioned winding device 52 are installed on rotating shafts 24 (24a and 24b) of a delivery device 53. In other words, the winding bobbins 22 function as delivery bobbins in the heating/pressurizing/curing, and cooling-cure step.

The uncured resin-impregnated strands f2 which have been subjected to twisting processing, impregnated with a resin, and wound around the delivery bobbins 22 (22a and 22b) are delivered from the bobbins 22. The strands f2 are passed through the forming and curing device 40 constituting the forming and curing section 100B1 and 100B2 in a state in which a prescribed tensile force is applied to the strands f2 between the delivery device 53 and the forming and curing device 40 and between the forming and curing device 40 and a below-mentioned take-up device 80, whereby the strands f2 are made into flat fiber-reinforced plastic strands 2. The flat fiber-reinforced plastic strands 2 are then fed to the take-up section 100B3 under tension.

A more detailed description will now be given. A function, such as an electromagnetic brake, is imparted to this delivery device 53 in the forming and curing section 100B1 and 100B2, thereby enabling the application of an appropriate tensile force to the uncured resin-impregnated strands f2 delivered from the bobbins 22.

More specifically, the application of an appropriate tensile force to the twisted and uncured resin-impregnated strands 2 between the delivery device 53 and the forming and curing device 40 makes reinforcing fibers f in a bundle uniformly tense, and allows the cross section of the strands f2 before fed to the forming and curing section 100B1 and 100B2 to be made into a circular, that is, round cross-section (FIG. 6 (b)).

It should be noted that, in this embodiment, as mentioned above, in the case where a carbon fiber strand comprising a bundle of 6,000 to 60,000 carbon fibers is employed as the carbon fiber bundle f1, a force of 500 g/strand to 10 kg/strand is preferably imparted to the resin-impregnated strand f2 as a tensile force. With a tensile force of less than 500 g/strand, it is difficult to ensure a round shape, whereas a tensile force of more than 10 kg/strand causes a trouble of breakage of the fiber f on the way of manufacture, resulting in a problem that stable manufacture becomes impossible. The optimum range of the tensile force is particularly from 2 kg/strand to 8 kg/strand.

In the present specification, the meaning of the term "circular" shall include "approximately circular" in which the diameter ratios of the longitudinal to the transverse direction on a cross-section is within a range of 1.0 to 1.5.

According to this embodiment, in the manufacturing equipment 100 having the aforementioned configuration, the twisted and uncured resin-impregnated strands f2 delivered from the delivery bobbins 22 are guided by a guide member 25 as needed, and continuously fed to the heating/pressurizing/curing section 100B1 in a state in which said strands are lined up at prescribed intervals (P1) as illustrated in FIG. 6 (b).

In this embodiment, as mentioned above, the heating/pressurizing/curing section 100B1 and the cooling section 100B2 are provided in the forming and curing device 40 illustrated in FIG. 3. In this embodiment, the forming and curing device 40 comprises an upper belt device 40A and a lower belt device 40B which are symmetrically arranged in a vertical direction. In this embodiment, the upper belt device 40A and the lower belt device 40B have the same configuration, and accordingly, the upper belt device 40A will be now described.

Referring to FIG. 3 to FIGS. 5(a) and 5(b), the upper belt device 40A comprises: a belt body 41A which is a steel belt; a heating and pressurizing roller 42A configured to wind and thereby rotationally move said belt body 41A; a cooling roller 43A; and a pressurizing roller 44A. As the belt body 41A, for example, an endless steel belt having a thickness t 41 of 0.5 to 1.5 mm is suitably applicable. In this embodiment, a stainless steel belt having a thickness t 41 of 1.0 mm, a width w 41 (refer to FIG. 5 (a)) of 500 mm, and a circumference of 5530 mm was employed.

Figure 5:
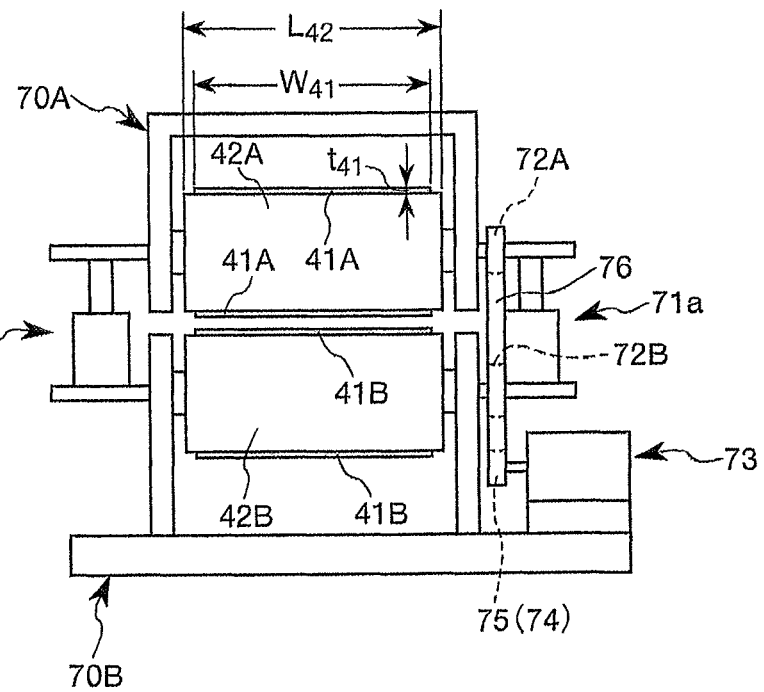
FIG. 5 is a schematic cross-sectional view of the forming and curing device illustrated in FIG. 4.
Figure 5:
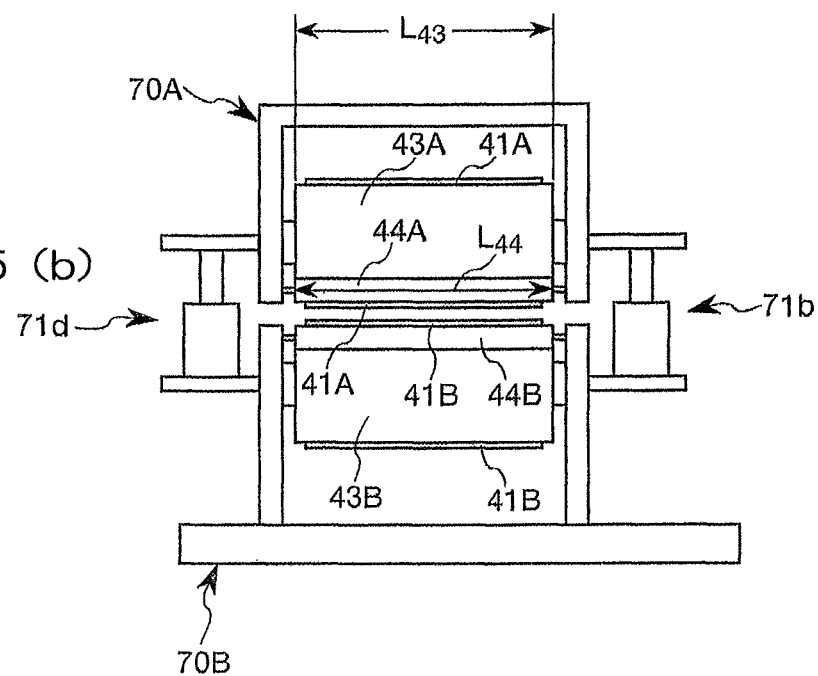

Furthermore, in this embodiment, as illustrated in FIG. 3 and FIG. 5 (a), as the heating and pressurizing roller 42A, a cylindrical steel drum having an outside diameter D42 of 500 mm and a drum length L42 of 600 mm was employed, and the heating and pressurizing roller 42A had a configuration in which an electric heater (not illustrated) was provided as a heating source inside the drum. The heating and pressurizing roller 42A is situated at the heating/pressurizing/curing section 100B1, and heats the belt body 41A to a prescribed temperature, for example, 130 C.° to 180 C.°, the belt body 41A being configured to heat and pressurize the resin-impregnated strands f2.

In this embodiment, as the cooling roller 43A, the same steel drum as that used as the aforementioned heating and pressurizing roller 42A was employed. That is, as illustrated in FIG. 3 and FIG. 5(b), a cylindrical steel drum having an outside diameter D43 of 500 mm and a drum length L43 of 600 mm was employed, and a cooling system (for example, cooling water piping) (not illustrated) was arranged inside the drum. The cooling roller 43A cools the belt body 41A situated in the cooling section 100B2 to a prescribed temperature, for example, approximately 5° C. to 20° C.

In the belt device 40A having the aforementioned configuration of this embodiment, the distance between the heating and pressurizing roller 42A and the cooling roller 43A, that is, the distance L40 between the respective rotating shafts of the respective rollers was 1980 mm.

According to this embodiment, a plurality of, six in this embodiment, pressurizing rollers 44A are arranged so as to be situated between the heating and pressurizing roller 42A and the cooling roller 43A. In this embodiment, the pressurizing roller 44A had a diameter D44 of 85 mm and a drum length L44 (refer to FIG. 5 (b)) of 600 mm. It is a matter of course that the pressurizing roller 44A is not limited to such shape and dimensions of this embodiment. Furthermore, the pressurizing roller 44A itself may be a heating and pressurizing roller having a heating source.

As mentioned above, in this embodiment, the lower belt device 40B also had the same configuration as that of the aforementioned upper belt device 40A. Therefore, component parts of the lower belt device 40B, the parts having the same configuration and function as those of the upper belt device 40A, are assigned the same reference numerals accompanied with "B", and detailed description thereof will be omitted here.

Figure 4:
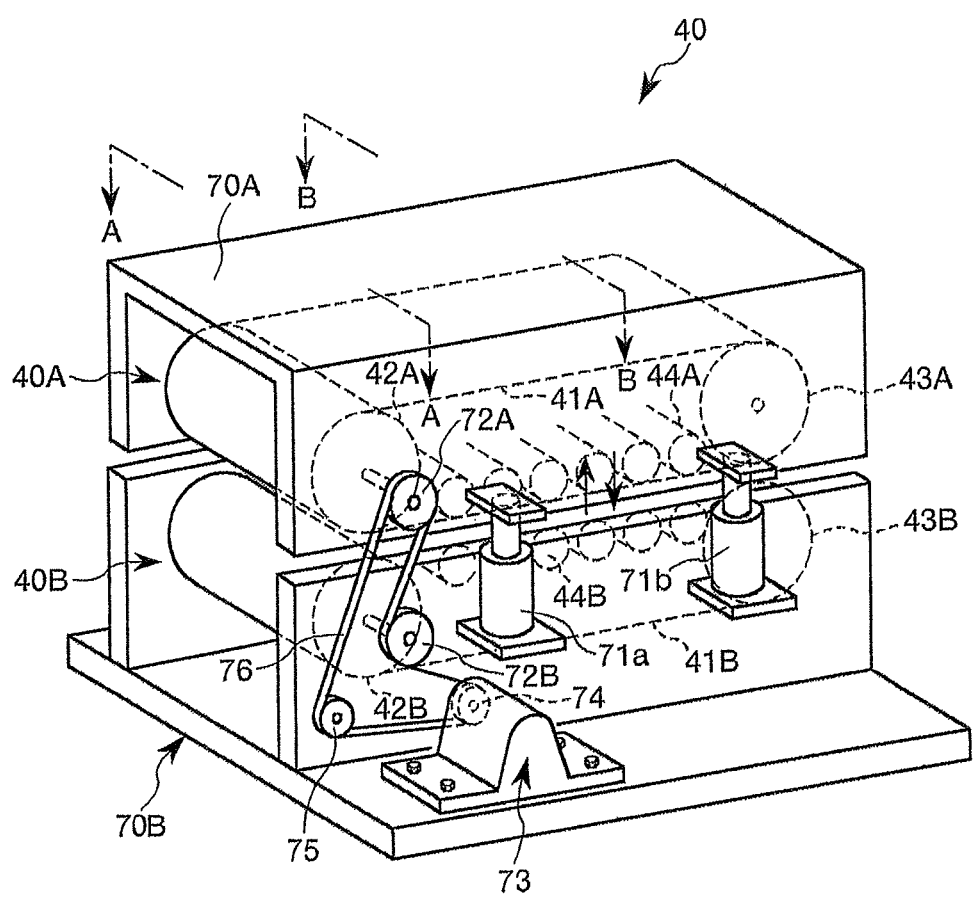
FIG. 4 is a schematic configuration perspective view of a forming and curing device in the manufacturing equipment illustrated in FIG. 3.

Here, particularly, also with reference to FIG. 4 and FIGS. 5(a) and 5(b), the whole configuration of the forming and curing device 40 will be further described in detail.

The forming and curing device 40 comprises an upper frame 70A for the upper belt device 40A and a lower frame 70B for the lower belt device 40B, the upper frame 70A and the lower frame 70B being housings which are symmetrically arranged in a vertical direction and configured to support the upper belt device 40A and the lower belt device 40B, respectively.

On the upper frame 70A, the heating and pressurizing roller 42A, the cooling roller 43A, and the pressurizing roller 44A of the upper belt device 40A are rotatably supported, and the steel belt 41A is rotatably wound around these rollers 42A, 43A, and 44A. Likewise, on the lower frame 70B, a heating and pressurizing roller 42B, a cooling roller 43B, and a pressurizing roller 44B of the lower belt device 40B are rotatably supported, and a steel belt 41B is rotatably wound around these rollers 42B, 43B, and 44B.

According to this embodiment, in the aforementioned configuration, the upper frame 70A is vertically movably supported on the lower frame 70B via, for example, vertical-gap adjusting means (hoisting-and-lowering devices) 71 (71a to 71d) which are hydraulic power devices. In this embodiment, the four hoisting-and-lowering devices 71 (71a to 71d) in total are symmetrically arranged on both sides of the upper frame 70A and both sides of the lower frame 70B which rotatably hold the corresponding ones of rollers 42 (42A and 42B), 43 (43A and 43B), and 44 (44A and 44B) of the belt devices 40A and 40B.

Thus, driving of the vertical-gap adjusting means 71 (71a to 71d) allows the upper belt device 40A to be vertically movable to the lower belt device 40B, and the gap G41 (FIG. 3) between the steel belts 41A and 41B is set to a predetermined value, accordingly.

Furthermore, in this embodiment, by a driving belt 76 which is stretched between driving pulleys 72A and 72B attached to the rotating shafts of the heating and pressurizing rollers 42A and 42B of the upper and the lower belt devices 40A and 40B, respectively; a driving pulley 74 of a driving motor 73 mounted on the lower frame 70B; and a tension adjusting roller 75, the driving motor 73 is driven thereby to drive and rotate the heating and pressurizing rollers 42A and 42B, and the steel belts 41A and 41B of the upper and the lower belt devices 40A and 40B are driven and rotated, accordingly. Thus, the cooling rollers 43A and 43B and the pressurizing rollers 44A and 44B are also driven and rotated. The steel belts 41A and 41B are moved at a certain speed within a range of, for example, 0.1 to 5 m/min.

Accordingly, in this embodiment, at least one resin-impregnated strand f2 twisted and being in an uncured state, usually 50 to 300 strands f2 are fed, in a state of tension, between a pair of the heated steel belts 41A and 41B facing each other and making rotational movements. The steel belts 41A and 41B are heated to a prescribed temperature via the heating and pressurizing rollers 42A and 42B, and accordingly, the resin-impregnated strand f2 is heated by being sandwiched between the steel belts 41A and 41B. Furthermore, a prescribed gap G41 between the steel belts 41A and 41B are set by the heating and pressurizing rollers 42A and 42B and the pressurizing rollers 44A and 44B, and therefore, the resin-impregnated strand f2 is pressurized from both sides of the strand f2 by the steel belts 41A and 41B, whereby the round cross section of the strand f2 is formed into a flat shape, resin is cured in that flat shape, and, with the shape being kept, the strand 2 is cooled by the cooling rollers 43A and 43B.

According to the present invention, the resin-impregnated strand f2 is twisted, and therefore, when the strand f2 is formed flat at a steel belt pressurizing unit, the strand f2 is restrained also in the width direction, whereby a flat strand having a certain width is manufactured.

Thus, the resin-impregnated strand f2 fed to the forming and curing device 40 comprising the belt devices 40A and 40B having the aforementioned specific configuration described in this embodiment is formed flat by heating and pressurizing at prescribed pressure and temperature at the heating/pressurizing/curing section 100B1, and cured to be made into the flat fiber-reinforced plastic strand 2. In this embodiment, as mentioned above, the gap G41 between the belt bodies 41A and 41B which sandwich the strand f2 so as to obtain the flat fiber-reinforced plastic strand 2 having a desired thickness (t) is suitably adjusted by the gap adjusting means for the upper and lower belt devices (hoisting-and-lowering means) 71 (71a to 71d).

Usually, the moving speed of the strand f2 which moves through the forming and curing section 100B1 and 100B2, and the heating temperature and the pressure of the heating/pressurizing/curing section 100B1 and the cooling temperature of the cooling section 100B2 are suitably determined by, for example, the type of impregnated resin and the amount of resin impregnated in the flat fiber-reinforced plastic strand 2 as a product. By making longer the length LB1 of the heating/pressurizing/curing section 100B1 and the length LB2 of the cooling section 100B2, the speed of manufacturing the flat fiber-reinforced plastic strand 2 can be increased.

According to the manufacturing method of this embodiment described above, a plurality of the resin-impregnated strands f2 having a round cross section and being arranged at predetermined intervals P1 as illustrated in FIGS. 6(a) and 6(b) are formed into flat strands 2s in the heating/pressurizing/curing section 100B1 as illustrated in FIG. 6 (c), the strands 2s having a rectangular cross section and containing an uncured resin. Then, the flat strands 2s are cured to be made into the flat fiber-reinforced plastic strands 2.

Subsequently, a plurality of the flat fiber-reinforced plastic strands 2 cooled in the cooling section 100B2 and peeled away from the belts 41A and 41B is fed to the take-up section 100B3, and wound around the reel 80 through the strand-surface grinding device 50. The strand-surface grinding device 50 will be described in detail later.

It should be noted that, in order to prevent the adhesion of the uncured flat strands 2s to the belts 41 (41A and 41B) of the forming and curing device 40 and the resulting inhibition of good peeling of the cured flat fiber-reinforced plastic strand 2 away from the belts 41A and 41B, the outer surfaces of the belts 41A and 41B are preferably maintained smooth. For that, it is beneficial that grinding means 45 (45A and 45B), for example, abrasive cloths are provided as illustrated in FIG. 3, and always or periodically brought into contact with the surfaces of the steel belts to grind said surfaces. Furthermore, as needed, release-agent applying means 46 (46A and 46B) may be provided together with the aforementioned steel belt grinding means 45, or instead of the grinding means 45. The provision of the release-agent applying means 46 and thin application of a release agent onto the belt surfaces allow continuous good peeling. The case of using a release agent will be described as follows.

In order to prevent a resin from adhering to the steel belts 41 (41A and 41B), the inventors examined releasing treatments, such as coating of the surfaces of the steel belts with fluororesin, silicon resin, siloxane resin, or other resins, and the use of a Teflon material ("Teflon": trade name of polytetrafluoroethylene manufactured by E. I. du Pont de Nemours & Co.) as a surface layer. However, it was found that the hardness of a surface layer resulting from these releasing treatments is considerably lower than the hardness of a steel belt, and hence, in manufacture in which sandwich-forming of a hard material such as a thermoset fiber-reinforced plastic material is performed, problems arise that, for example, it is difficult to achieve the surface layer of sufficient thickness precision, and the surface layer is deformed or damaged due to continuous use and thus cannot resist long-term continuous operation.

Therefore, as mentioned above, in order to improve releasability of resin of the resin-impregnated strands f2 from the steel belts 41, a release agent was thinly applied to the surfaces of the steel belts, and furthermore, the steel belts were heated, whereby the release agent was baked thereonto, and, as a result, there were found the followings:

(1) Without using a release paper or a release film, adhesion of resin to the steel belts can be minimized, and also, the surface of the formed flat fiber-reinforced plastic strand 2 is well finished;

(2) Since a coating of a release agent is very thin, the coating does not have softness like that of a Teflon film, and therefore, troubles, such as deformation and damage of the surface, are not caused, and thus, the hardness of the steel belt 41 can be made use of as it is for press-forming, and a product of great thickness precision can be achieved, accordingly; and (3) Periodic application of a release agent eliminates, for example, the need for recoating of the surface due to peeling off of the release agent, and hence, long-term continuous manufacture is feasible. As the release agent, a fluorine release agent or a silicon release agent is suitably employed.

It should be noted that, in the case where a release agent is applied to the surfaces of the steel belts, a problem arises that the release agent adheres to the surface of the formed flat fiber-reinforced plastic strand 2, whereby, depending on the way of using the strand thereafter, necessary adhesive performance is not attained. Therefore, in the case where a release agent is not applied, as mentioned above, a conceivable measure is to use, for example, a release paper or a release film, or peel ply (peeling cloth) between the belts 41 (41A and 41B) and the resin-impregnated strand f2. However, in the case where a subsidiary material such as a release paper is used, there arise many problems of material costs, equipment costs, and furthermore, disposal of a used subsidiary material.

Therefore, in this embodiment, in the case where a release agent is used as needed, a surface grinding device is arranged as the release agent removal means 50 at a point subsequent to the forming and curing device 40 as mentioned above. The surface grinding device 50 is a device which lightly grinds the upper and lower surfaces of the formed and cured flat fiber-reinforced plastic strand 2 by sandpaper, an iron file, or blast processing. The results of the experiment revealed that such simple grinding device 50 allows a release agent to be removed from the surface of the strand, and furthermore, an anchor effect produced by unevenness resulting from the grinding allows the strand to have a higher adhesive property than a flat fiber-reinforced plastic strand obtained without using a release agent. For removing a release agent from the flat fiber-reinforced plastic strand, besides the aforementioned surface grinding, for example, an agent washing device which uses a solvent such as toluene is also applicable.

It should be noted that, in the case where the fiber-reinforced plastic strand as a product has a circular cross section, the curved surface of the strand needs to be ground, and, the grinding of the surface is difficult, accordingly. On the other hand, in the present invention, the cross section of the fiber-reinforced plastic strand of an obtained product is in a flat form having a certain thickness and twisted fiber, and therefore, for example, the use of the aforementioned approximately #400 to #800 sandpaper allows continuous surface grinding to be easily performed.

As mentioned above, each surface of the flat fiber-reinforced plastic strands 2 sent out from the forming and curing device 40 is ground by the surface grinding device 50 in the take-up section 100B3, and then, the flat fiber-reinforced plastic strands 2 are wound around the take-up reel 80 having a large diameter of not less than 1 m at a prescribed speed.

Method and Equipment for Manufacturing the Flat Fiber-Reinforced Plastic Strand Sheet Next, a method of manufacturing the flat fiber-reinforced plastic strand sheet 1 will be described. The flat fiber-reinforced plastic strand 2 used to produce the flat fiber-reinforced plastic strand sheet 1 is manufactured by the same method as that of manufacturing the flat fiber-reinforced plastic strand 2 which was described with reference to FIG. 1 to FIG. 3 and other drawings, and therefore, the same manufacturing equipment 100 (100A and 100B) is applicable. However, there is only one difference, which is that, as illustrated in FIG. 7, in the take-up section 100B3 of the flat-forming, cooling, and take-up section 100B, a sheet forming device 60 is arranged at a point subsequent to the surface grinding device 50.

Figure 7:
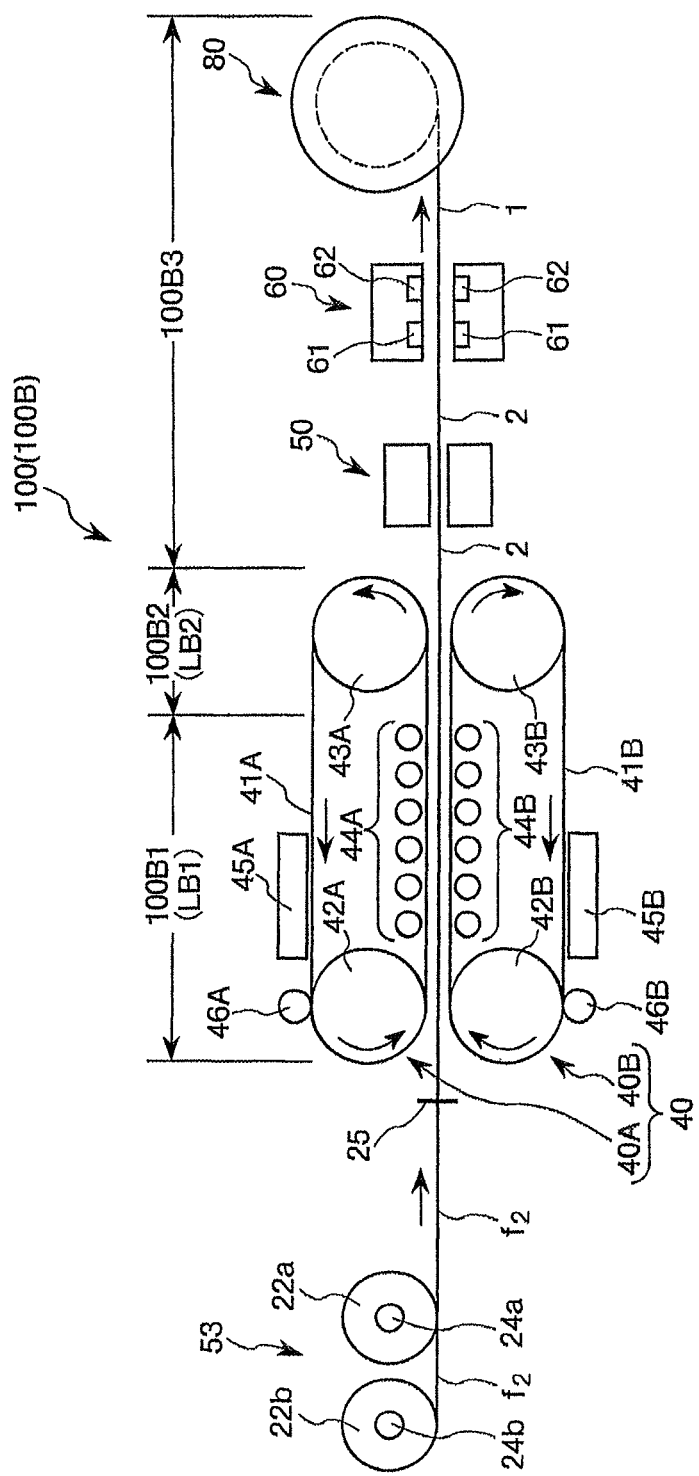
FIG. 7 is a schematic configuration view for describing an embodiment of manufacturing equipment configured to manufacture the flat fiber-reinforced plastic strand sheet according to the present invention.

That is, the manufacturing equipment 100 (100A and 100B) for manufacturing the flat fiber-reinforced plastic strand sheet 1 according to the present invention comprises: a fiber-feeding, resin-impregnating, winding section 100A (FIG. 1) illustrated in FIG. 1; and a flat-forming (heating/pressurizing/curing), cooling, and take-up section 100B (100B1, 100B2, 100B3) illustrated in FIG. 7.

According to this embodiment, in the manufacturing equipment 100 illustrated in FIG. 1, the resin-impregnated strands f2 having undergone the twisting processing and resin impregnation step are manufactured as described above.

Next, in the flat-forming (heating/pressurizing/curing), cooling, and take-up section 100B of the manufacturing equipment 100 illustrated in FIG. 7, flat-forming and resin-curing are performed for the strands f2 having undergone the twisting processing and resin impregnation step, whereby flat fiber-reinforced plastic strands 2 are produced, and subsequently, a flat fiber-reinforced plastic strand sheet 1 is produced.

A more detailed description will now be given. According to this embodiment, as illustrated in FIG. 7, a plurality of the flat fiber-reinforced plastic strands 2 is cooled and peeled away from the belts in the heating/pressurizing/curing section 100B1 and the cooling section 100B2, and is made into the flat fiber-reinforced plastic strand sheet 1 via the surface grinding device 50 and the sheet forming device 60, and wound around the reel 80.

As mentioned above, the surfaces of the flat fiber-reinforced plastic strands 2 peeled away from the heating/pressurizing/curing and cooling device 40 have extreme smoothness, and furthermore, a release agent sometimes adheres to the surfaces. The good surface smoothness of the flat fiber-reinforced plastic strands 2 or the adhesion of a release agent to the surfaces is not preferable when the flat fiber-reinforced plastic strand sheet 1 as a product is bonded as a reinforcement to a structure, or when the sheet 1 is used as an FRP material for RTM.

Hence, it is preferable that, as mentioned above, a release agent removing means such as the surface grinding device 50 is provided at an outlet of the forming and curing device 40, whereby the surfaces of the flat fiber-reinforced plastic strands 2 sent from the forming and curing device 40 are made rough, and a release agent is removed from the surfaces of the flat fiber-reinforced plastic strands 2.

The flat fiber-reinforced plastic strands 2 whose surfaces have been made rough to have a prescribed roughness and from the surfaces of which the release agent has been removed by the surface grinding device 50 are fed to the sheet forming device 60 in a state in which the strands 2 are arranged in the longitudinal direction with keeping a gap (g) therebetween as illustrated in FIG. 6 (*c*). In the sheet forming device 60, a fixing material 3 is bonded to each of the flat fiber-reinforced plastic strands 2 to form the flat fiber-reinforced plastic strand sheet 1 as illustrated in FIG. 9. In the sheet forming device 60, there are arranged: a fixing material supply means 61 configured to supply the fixing material 3; and a heating, adhesion, cooling, pressurizing means 62 configured to bond the fixing material 3 to the flat fiber-reinforced plastic strand 2 and unite a plurality of the flat fiber-reinforced plastic strands 2, thereby making the strands 2 into a sheet.

That is, in this embodiment, as mentioned above, the fixing material supply means 61 supplies the fixing material 3, such as weft or a mesh material, to both sides or one side of the aligned flat fiber-reinforced plastic strands 2, and subsequently unites the strands by the heating, adhesion, cooling, pressurizing means 62.

The above-described flat fiber-reinforced plastic strand 2 and method of manufacturing the flat fiber-reinforced plastic strand sheet 1 according to the present invention have the following merits.

With the manufacturing method of the present invention, resin-impregnated strands 2 which have been made round by giving an appropriate tensile force to resin-impregnated strands having prescribed twists are sandwiched between the heated steel belts 41A and 41B and pressurized, whereby, using, for example, 50K strands having a large diameter, a flat fiber-reinforced plastic strand sheet 1 having a large fiber mass per unit area, a thickness (t) of 1.0 mm to 2 mm (fiber mass per unit area: 900 to 1800 g/m$^2$) and a width (W) of 5 mm to 500 mm can be manufactured efficiently, in other words, manufactured with greatly increased forming-yields. Furthermore, it was found that, according to the manufacturing method of this embodiment, the resin-impregnated strands f2 are less damaged and thread breakage during manufacture occurs with far less frequency. Hence, particularly, the flat fiber-reinforced plastic strand sheet 1 according to the present invention, in spite of having a high mass per unit area and high strength, has good deformability, is suitably applicable in, for example, RTM, and allows a large-sized formed body with high strength to be manufactured.

DESCRIPTION OF REFERENCE NUMERALS 1 flat fiber-reinforced plastic strand sheet
2 flat fiber-reinforced plastic strand
2s flat resin-impregnated strand
3 fixing material
17 resin impregnation tank
40 (40A, 40B) forming and curing device (heating/pressurizing/curing, and cooling device)
41 (41A, 41B) steel belt (belt body)
42 (42A, 42B) heating and pressurizing roller
43 (43A, 43B) cooling roller
44 (44A, 44B) pressurizing roller
45 steel belt grinding means
50 strand surface grinding device (release agent removing means)
60 sheet forming device
80 take-up reel
f reinforcing fiber filament
f1 reinforcing fiber bundle (strand)
f2 uncured resin-impregnated strand
R matrix resin

The invention claimed is:

1. A method of manufacturing a flat fiber-reinforced plastic strand by a forming and curing device comprising an upper belt device and a lower belt device which are symmetrically arranged in a vertical direction, wherein each of said upper belt device and said lower belt device comprises:
   a heating and pressurizing roller having an electric heater inside said heating and pressurizing roller for heating thereof,
   a cooling and pressurizing roller having cooling water piping inside said cooling and pressurizing roller for cooling thereof,
   a steel belt wound around said heating and pressurizing roller and said cooling and pressurizing roller to make a rotation movement, and
   a pressurizing roller arranged so as to be situated inside said steel belt rotatably moved and between said heating and pressurizing roller and said cooling roller,
   the method comprising:
   (a) feeding a twisted resin-impregnated strand in an uncured state, the strand including a plurality of reinforcing fibers, in a state of tension between the steel belts of the upper and lower belt devices and making rotation movements, the steel belts of the upper and lower belt devices facing each other and each steel belt being heated to a temperature in the range of 130° C. to 180° C. by the heating and pressurizing roller;
   (b) sandwiching and heating the resin-impregnated strand by the heated steel belts, and pressurizing the resin-impregnated strand by the heated steel belts from both sides of the strand to form a cross section of the strand into a flat shape, a gap between the heated steel belts being set by hoisting-and-lowering devices to obtain said flat fiber-reinforced plastic strand having a thickness in the range of 0.2 to 5.0 mm; and
   (c) with the shape of the strand being kept, curing and cooling the resin of the resin-impregnated strand by the steel belts, each steel belt being cooled to a temperature in the range of 5° C. to 20° C. by the cooling and pressurizing roller.

2. The method of manufacturing the flat fiber-reinforced plastic strand according to claim 1, wherein the number of twists of the resin-impregnated strand is from 5 twists/m to 30 twists/m.

3. The method of manufacturing the flat fiber-reinforced plastic strand according to claim 1, wherein the resin-impregnated strand is tensioned with a force of 500 g/piece to 10 kg/piece.

4. The method of manufacturing the flat fiber-reinforced plastic strand according to claim 1, wherein a release agent is continuously or periodically applied to the steel belts which make rotation movements, and the steel belts are further heated to bake said release agent onto the steel belts.

5. The method of manufacturing the flat fiber-reinforced plastic strand according to claim 4, wherein a surface of the flat fiber-reinforced plastic strand produced in the step (b) is separated and sent out from the steel belts, said separated flat fiber-reinforced plastic strand is ground or washed with a solvent to remove a release agent which adheres to the surface.

6. A method of manufacturing a flat fiber-reinforced plastic strand, the method comprising:
   (a) feeding a twisted resin-impregnated strand in an uncured state, the strand including a plurality of reinforcing fibers, in a state of tension between a pair of heated steel belts facing each other and making rotation movements; and
   (b) sandwiching and heating the resin-impregnated strand by the steel belts, and pressurizing the resin-impregnated strand from both sides of the strand to form a cross section of the strand into a flat shape, and, with the shape being kept, curing and cooling the resin,
   wherein a release agent is continuously or periodically applied to the steel belts which make rotation movements, and wherein the steel belts are further heated to bake said release agent onto the steel belts.

7. The method of manufacturing the flat fiber-reinforced plastic strand according to claim 6, wherein a surface of the flat fiber-reinforced plastic strand produced in the step (b) is separated and sent out from the steel belts, said separated flat fiber-reinforced plastic strand is ground or washed with a solvent to remove a release agent which adheres to the surface.

* * * * *